United States Patent
Tanabe et al.

(10) Patent No.: US 8,355,309 B2
(45) Date of Patent: Jan. 15, 2013

(54) OPTICAL PICKUP DEVICE

(75) Inventors: Noritaka Tanabe, Osaka (JP); Daisuke Matsubara, Kyoto (JP); Kenya Nakai, Tokyo (JP)

(73) Assignees: Funai Electric Co., Ltd., Osaka (JP); Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 12/717,410

(22) Filed: Mar. 4, 2010

(65) Prior Publication Data

US 2010/0226233 A1    Sep. 9, 2010

(30) Foreign Application Priority Data

Mar. 6, 2009    (JP) ................. 2009-052885

(51) Int. Cl.
*G11B 7/00* (2006.01)
(52) U.S. Cl. ......... 369/112.24; 369/112.23; 369/112.01
(58) Field of Classification Search ............. 369/44.37, 369/112.01, 112.23, 112.24
See application file for complete search history.

(56) References Cited

U.S. PATENT DOCUMENTS

| | | | |
|---|---|---|---|
| 2005/0002286 A1 | 1/2005 | Yonezawa et al. | ......... 369/44.14 |
| 2006/0164954 A1 | 7/2006 | Hashimura | |
| 2009/0022040 A1* | 1/2009 | Matsuda et al. | ......... 369/112.24 |
| 2009/0059771 A1 | 3/2009 | Miyake | ............. 369/112.24 |

FOREIGN PATENT DOCUMENTS

| | | |
|---|---|---|
| CN | 101350204 A | 1/2009 |
| JP | A-10-74328 | 3/1998 |
| JP | 2006-004547 | 1/2006 |
| JP | A-2006-202416 | 8/2006 |
| JP | 2007-334990 A | 12/2007 |
| JP | 2007334990 A * | 12/2007 |
| JP | 2009-026385 | 2/2009 |
| WO | WO 2007/114047 A1 | 10/2007 |

* cited by examiner

*Primary Examiner* — Latanya Bibbins
(74) *Attorney, Agent, or Firm* — Morgan, Lewis & Bockius LLP (57) ABSTRACT

An optical pickup device includes a first optical system and a second optical system. The first optical system and the second optical system each include a mirror member that reflects light from a light source to change a direction of propagation of the light to a direction substantially perpendicular to the information storage surface of an optical disc. The first optical system and the second optical system are arranged such that a direction in which light from a first light source enters a first mirror member is substantially perpendicular to a direction in which light from a second light source enters a second mirror member.

9 Claims, 5 Drawing Sheets

OPTICAL PICKUP DEVICE

This application is based on Japanese Patent Application No. 2009-052885 filed on Mar. 6, 2009, the contents of which are hereby incorporated by reference.

BACKGROUND OF THE INVENTION

1. Field of the Invention

The present invention relates to an optical pickup device and more particularly to the configuration of an optical pickup device having two separate optical systems that are selectively used according to the type of optical disc.

2. Description of Related Art

Conventionally, optical pickup devices are used to read information on an optical disc and write information on the optical disc. There are a plurality of types of optical discs such as a compact disc (CD), a digital versatile disc (DVD) and a blue-ray disc (BD). Thus, for convenience and the like, among conventional optical pickup devices, there are some optical pickup devices that can be compatible with a plurality of types of optical discs.

Among the optical pickup devices compatible with a plurality of types of optical discs, there are some optical pickup devices which have two separate optical systems that are selectively used according to the type of optical disc (for example, see patent documents 1 and 2). Here, the optical systems each function to guide light emitted from a light source to the information storage surface of the optical disc and to guide the light reflected off the information storage surface to a light receiving element. As a specific example of these optical pickup devices, there is an optical pickup device in which one of the optical systems is used such as for reading information on a BD and in which the other optical system is used such as for reading information on a DVD or a CD.

Incidentally, in an optical pickup device, an objective lens for condensing light emitted from a light source on the information storage surface of an optical disc is mounted on an objective lens actuator. This objective lens actuator can move the objective lens mounted at least in a focus direction and in a track direction. Here, the term "focus direction" refers to a direction that is perpendicular to the information storage surface of the optical disc; the term "track direction" refers to a direction that is parallel to a radial direction of the optical disc. The purpose of moving the objective lens in the focus direction is to control (perform focus control) the focal position of the objective lens such that the focal position is constantly located on the information storage surface. The purpose of moving the objective lens in the track direction is to control (perform track control) a light spot obtained by condensing light through the objective lens such that the light spot constantly follows the track of the optical disc.

For example, as disclosed in patent document 1, among the optical pickup devices which have two separate optical systems, there are some optical pickup devices in which the optical systems individually include separate objective lens actuators (that is, include two actuators). However, in order to reduce the size of and the number of components of the device and the like, as disclosed in patent document 2, it is preferable to mount the objective lenses included in the optical systems on one lens holder and to move the two objective lenses with one objective lens actuator.

[Patent document 1] JP-A-H10-74328
[Patent document 2] JP-A-2006-202416

SUMMARY OF THE INVENTION

Incidentally, when two objective lenses are mounted on one lens holder, it may be necessary to mount the two objective lenses such that the space between the two objective lenses is minimized. This is because, for example, in an objective lens actuator that suspends a lens holder with a wire, if the space between the two objective lenses mounted on the lens holder is large, the drive sensitivity and the DC tilt of the objective lens actuator may be degraded, and this degradation is needed to be reduced.

The optical pickup device having two separate optical systems includes, in the optical systems, upward reflecting mirrors which reflect light such that the direction of propagation of light emitted from a light source is perpendicular to the information storage surface of an optical disc. Hence, as described above, when the space between the two objective lenses is reduced, it is necessary to arrange the upward reflecting mirrors included in the optical systems as close to each other as possible. Conventionally, there are few examples of development with consideration given to this point, and furthermore, there are no optical pickup devices in which this is achieved at a low cost.

To overcome the foregoing problem, the present invention has an object to provide an optical pickup device which has two separate optical systems and with which it is possible to minimize, at a low cost, the space between objective lenses included in the optical systems.

To achieve the above object, according to the present invention, there is provided an optical pickup device including: a first optical system including: a first light source; a first mirror member that reflects light from the first light source to change a direction of propagation of the light to a direction substantially perpendicular to information storage surface of an optical disc; a first objective lens that condenses the light reflected off the first mirror member on the information storage surface; and a first light receiving element that receives return light resulting from the reflection off the information storage surface; a second optical system including: a second light source that emits light having a wavelength different from the first light source; a second mirror member that reflects the light from the second light source to change a direction of propagation of the light to the direction substantially perpendicular to the information storage surface; a second objective lens that condenses the light reflected off the second mirror member on the information storage surface; and a second light receiving element that receives return light resulting from the reflection off the information storage surface; and an objective lens actuator that includes a lens holder holding the first objective lens and the second objective lens and that can move the first objective lens and the second objective lens at least in a focus direction and in a track direction. In the optical pickup device, the first optical system and the second optical system are arranged such that a direction in which the light from the first light source enters the first mirror member is substantially perpendicular to a direction in which the light from the second light source enters the second mirror member.

With the optical pickup device configured as described above, it is possible to simplify the shape of the first mirror member and the second mirror member and arrange the reflective surfaces of these two mirror members close to each other. Thus, it is possible to reduce the cost necessary to work the mirror members and thus minimize, at a low cost, the space between the objective lenses included in the optical systems.

In the optical pickup device configured as described above, the first mirror member and the second mirror member may be a plate-shaped member that is substantially rectangular as seen from a reflective surface, and, in at least one of the first mirror member and the second mirror member, a cut surface may be formed by cutting a side surface of the plate-shaped member obliquely with respect to the reflective surface. This type of shape of the mirror member can be obtained by dicing, and thus it is easy to reduce the cost.

Preferably, in the optical pickup device configured as described above, in at least one of the first optical system and the second optical system, a plate-shaped light splitter is provided, and the light splitter guides part of the light from the light source to the optical disc and guides part of the return light from the optical disc to the light receiving element. This type of plate-shaped light splitter can be formed with a half mirror or a plate-shaped polarization beam splitter, and thus it is easy to reduce the cost of the optical pickup device.

In the optical pickup device configured as described above, an astigmatism introducing portion that introduces astigmatism is preferably provided in an optical path between the light splitter and the light receiving element; for example, a cylindrical lens can be used as the astigmatism introducing portion. When a focus error signal is obtained by an astigmatism method, it is necessary to adjust the direction of the astigmatism; with this configuration, it is possible to introduce the astigmatism while controlling the direction of the astigmatism.

Preferably, in the optical pickup device configured as described above, the optical system including the light splitter is used both for a DVD and a CD or either for the DVD or the CD, and the other optical system is used for a BD.

As described above, according to the present invention, in the optical pickup device having the two separate optical systems, it is possible to minimize, at a low cost, the space between the objective lenses included in the optical systems.

DETAILED DESCRIPTION OF PREFERRED EMBODIMENTS

An embodiment of an optical pickup device of the present invention will be described below in detail with reference to the accompanying drawings. Before that, in order for the present invention to be easily understood, an optical pickup device (previously developed optical pickup device) that is previously developed by the applicant of the present invention will be introduced so that problems of the previously developed optical pickup device are made clear.

(The Optical Pickup Device Previously Developed by the Applicant of the Present Invention)

Figure 5:
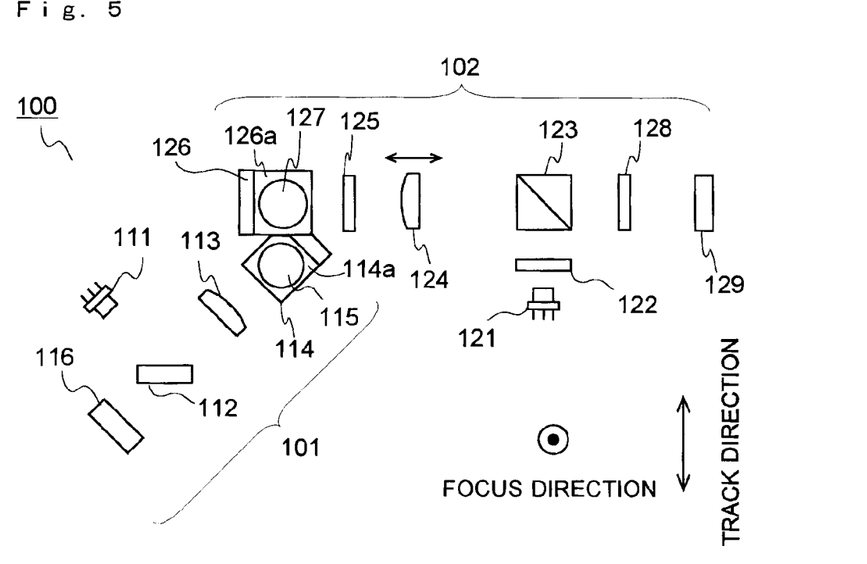
FIG. 5 is a schematic plan view showing the configuration of optical systems of an optical pickup device that is previously developed by the applicant of the present invention.

FIG. 5 is a schematic plan view showing the configuration of the optical systems of the optical pickup device that is previously developed by the applicant of the present invention. This optical pickup device 100 includes two separate optical systems 101 and 102. The optical system 101 is referred to as the first optical system; the optical system 102 is referred to as the second optical system.

The first optical system 101 is used when information is read from a DVD or a CD and when information is written on the DVD or the CD. The first optical system 101 includes a first light source 111, a half mirror 112, a first collimating lens 113, a first upward reflecting mirror 114, a first objective lens 115 and a first light receiving element 116.

The first light source 111 is a two-wavelength semiconductor laser that switches between laser light (with a wavelength band of 650 nm) for the DVD and laser light (with a wavelength band of 780 nm) for the CD and that can emit it. The half mirror 112 is formed in the shape of a plate, and reflects part of incoming light and transmits the remainder. In other words, part of laser light emitted from the first light source 111 is reflected and is fed to the first collimating lens 113. The first collimating lens 113 converts the incoming laser light into parallel light.

The laser light resulting from the conversion into parallel light by the first collimating lens 113 is fed to the first upward reflecting mirror 114. The first upward reflecting mirror 114 changes the direction of propagation of the incoming laser light to the direction (which is a direction perpendicular to the plane of the figure in FIG. 5) that is substantially perpendicular to the information storage surface (unillustrated) of an optical disc. That is, the reflective surface 114a of the first upward reflecting mirror 114 is inclined 45 degrees with respect to the direction of propagation of the laser light that is emitted from the first light source 111 and that enters the first upward reflecting mirror 114.

The laser light reflected off the first upward reflecting mirror 114 is condensed, by the first objective lens 115, on the information storage surface of the optical disc. The return light resulting from reflection off the information storage surface enters the half mirror 112 through the first objective lens 115, the first upward reflecting mirror 114 and the first collimating lens 113. Part of the light that enters the half mirror 112 is transmitted. The return light transmitted through the half mirror 112 is condensed on the first light receiving element 116. The first light receiving element 116 photoelectrically converts the received light signal to output an electrical signal. The output signals are processed into a reproduction signal, a focus error signal, a track error signal and the like.

The second optical system 102 is used when information is read from a BD and when information is written on the BD. The second optical system 102 includes a second light source 121, a diffraction element 122, a polarization beam splitter 123, a second collimating lens 124, a quarter wavelength plate 125, a second upward reflecting mirror 126, a second objective lens 127, a second cylindrical lens 128 and a second light receiving element 129.

The second light source 121 is a semiconductor laser that emits laser light (with a wavelength band of 405 nm) for the BD. The laser light emitted from the second light source 121 is divided by the diffraction element 122 into main light and sub-light. This is because the track error signal necessary to perform track control is obtained.

The polarization beam splitter 123 is formed in the shape of a cube obtained by adhering two prisms together, and is designed to reflect linear polarized light emitted from the second light source 121 and to transmit linear polarized light obtained by turning the above linear polarized light 90 degrees. Hence, the laser light fed from the diffraction element 122 to the polarization beam splitter 123 is reflected off the polarization beam splitter 123.

The second collimating lens 124 can be moved by unillustrated drive means in the direction of the optical axis (in the direction indicated by an arrow shown in FIG. 5). This is because this position operation changes the convergence and divergence of the laser light emitted from the second collimating lens 124 to change the convergence and divergence of the laser light entering the second objective lens 127. This configuration is employed so that spherical aberration can be corrected.

The laser light emitted from the second collimating lens 124 is fed to the quarter wavelength plate 125. The quarter wavelength plate 125 converts the incoming linear polarized laser light into circular polarized light. Laser light obtained by the conversion into the circular polarized light is fed to the second upward reflecting mirror 126. The second upward reflecting mirror 126 changes the direction of propagation of the incoming laser light to the direction (which is the direction perpendicular to the plane of the figure in FIG. 5) that is substantially perpendicular to the information storage surface (unillustrated) of the optical disc. That is, the reflective surface 126a of the second upward reflecting mirror 126 is inclined 45 degrees with respect to the direction of propagation of the laser light that is emitted from the second light source 121 and that enters the second upward reflecting mirror 126.

The laser light reflected off the second upward reflecting mirror 126 is condensed by the second objective lens 127 on the information storage surface of the optical disc. The return light reflected off the information storage surface is transmitted through the second objective lens 127 and is reflected off the second upward reflecting mirror 126. Then, the return light is converted by the quarter wavelength plate 125 into linear polarized light. The polarization direction of this linear polarized light is the direction obtained by turning 90 degrees the polarization direction of the linear polarized light emitted from the second light source 121. Hence, the return light that passes through the quarter wavelength plate 125 and then the second collimating lens 124 passes through the polarization beam splitter 123.

The return light that passes through the polarization beam splitter 123 have astigmatism introduced by the second cylindrical lens 128 and is condensed on the second light receiving element 129. The second light receiving element 129 photoelectrically converts the received light signal to output an electrical signal. The output signals are processed into a reproduction signal, a focus error signal, a track error signal and the like.

Among components that constitute the optical systems 101 and 102, the components other than the first objective lens 115 and the second objective lens 127 are mounted on a pickup base (unillustrated) of the optical pickup device 100. On the other hand, the first objective lens 115 and the second objective lens 127 are mounted on an objective lens actuator (not shown in FIG. 5) arranged in an upper portion of the pickup base, and can move in the focus direction, in the track direction and in a tilt direction. Here, the tilt direction refers to a direction of rotation of an axis perpendicular to the focus direction and the track direction.

Figure 6:
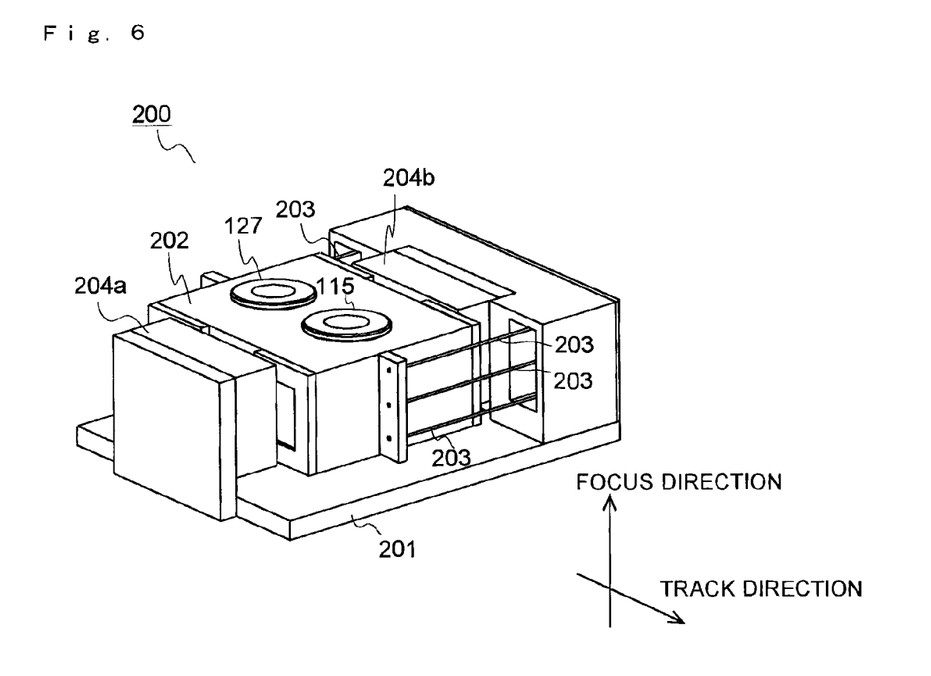
FIG. 6 is a schematic perspective view showing the configuration of an objective lens actuator included in the optical pickup device that is previously developed by the applicant of the invention.

FIG. 6 is a schematic perspective view showing the configuration of the objective lens actuator included in the optical pickup device 100. As shown in FIG. 6, the objective lens actuator 200 includes a lens holder 202 that holds the first objective lens 115 and the second objective lens 127. The lens holder 202 is sandwiched and suspended by wires 203, three wires on each of the left side and the right side of the lens holder 202. In an act base 201, through-holes (unillustrated) are formed; the laser light passes through the through-holes, and thus the light from the light sources enters the first objective lens 115 and the second objective lens 127.

The lens holder 202 is provided with a focus coil, track coils and tilt coils. The description of these coils is omitted because they are well known; current is supplied to these coils through the wires 203. Two permanent magnets 204a and 204b are provided to sandwich the lens holder 202 and to stand on the act base 201. The lens holder 202 is swung by utilizing the electromagnetic action of magnetic field generated by the permanent magnets 204a and 204b and current passed through the coils. This allows the movement of the first objective lens 115 and the second objective lens 127 in the focus direction, in the track direction and in the tilt direction.

The schematic configuration of the previously developed optical pickup device 100 is described above. Incidentally, as shown in FIG. 5, in the previously developed optical pickup device 100, the direction in which the laser light from the first light source 111 enters the first upward reflecting mirror 114 is inclined 45 degrees with respect to the tangential direction (which is the left and right direction of FIG. 5) of the optical disc. This is because a direction in which astigmatism is produced is adjusted, by the astigmatism produced when the return light passes through the plate-shaped half mirror 112, such that an astigmatism-type focus error signal is obtained.

In other words, in the optical pickup device 100, the direction in which the laser light from the first light source 111 enters the first upward reflecting mirror 114 and the direction in which the laser light from the second light source 121 enters the second upward reflecting mirror 126 are displaced about 45 degrees with respect to each other.

As described above, in order not to degrade the drive sensitivity and the DC tilt of the objective lens actuator 200, it is necessary to arrange the first objective lens 115 and the second objective lens 127 held by the lens holder 202 as close to each other as possible. Thus, it is necessary to arrange the reflective surface 114a of the first upward reflecting mirror 114 and the reflective surface 126a of the second upward reflecting mirror 126 close to each other. Then, in the optical pickup device 100, the shape of the first upward reflecting mirror 114 is well designed, and thus interference between the two upward reflecting mirrors (two mirror members) 114 and 126 is reduced, with the result that the two reflective surfaces 114*a* and 126*a* are arranged close to each other. The second upward reflecting mirror 126 does not employ a special shape in particular, and is a plate-shaped member that is substantially rectangular as seen in a direction perpendicular to the reflective surface 126*a*.

Figure 7A:
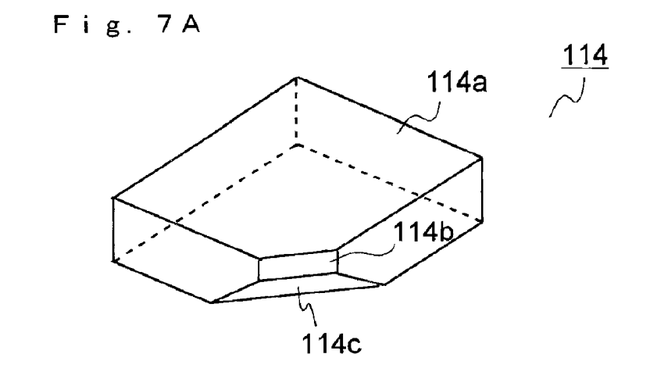
FIG. 7A is a schematic perspective view showing the first upward reflecting mirror included in the optical pickup device that is previously developed by the applicant of the invention.
Figure 7B:
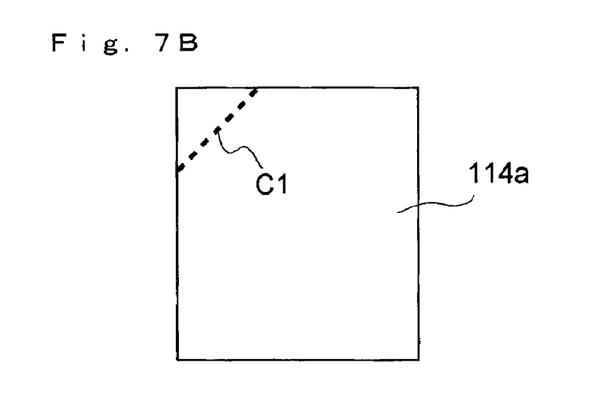
FIG. 7B is a diagram showing which portion needs to be cut so that the first upward reflecting mirror is formed in the shape shown in FIG. 7A.
Figure 7C:
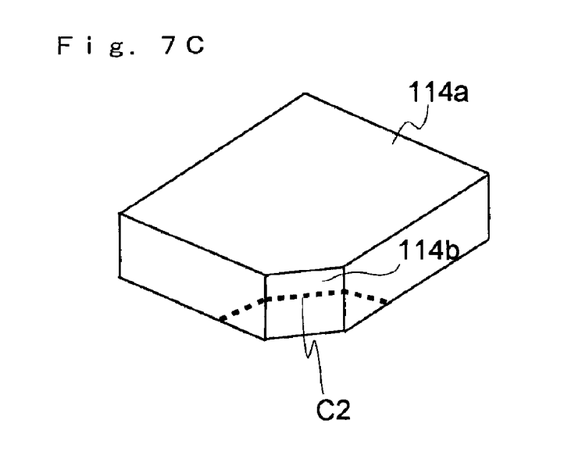
FIG. 7C is another diagram showing which portion needs to be cut so that the first upward reflecting mirror is formed in the shape shown in FIG. 7A.

FIGS. 7A, 7B and 7C are diagrams for showing the shape of the first upward reflecting mirror 114 included in the previously developed optical pickup device 100. FIG. 7A is a schematic perspective view of the first upward reflecting mirror 114; FIGS. 7B and 7C are diagrams showing which part needs to be cut so that the shape shown in FIG. 7A is formed.

As shown in FIG. 7A, the first upward reflecting mirror 114 is formed in a shape obtained by cutting part of a rectangular parallelepiped; this cutting forms two cut surfaces 114*b* and 114*c*. This cutting is performed in order both to remove an unnecessary corner portion of the first upward reflecting mirror 114 and thus bring the reflective surface 114*a* close to the reflective surface 126*a* of the second upward reflecting mirror 126 and to reduce the thickness of the first upward reflecting mirror 114, which is an obstruction when the reflective surface 114*a* is brought close to the reflective surface 126*a*.

In order to obtain such a shape, it is necessary to perform cutting along a cutting-plane line C1 shown in FIG. 7B and then further perform cutting along a cutting-plane line C2 shown in FIG. 7C. This cutting needs to be performed manually while the direction of the member is being controlled, and this costs a lot, with the result that the cost of the optical pickup device 100 is increased. The present invention is designed to eliminate this problem.

(The Embodiment of the Present Invention)

Figure 1:
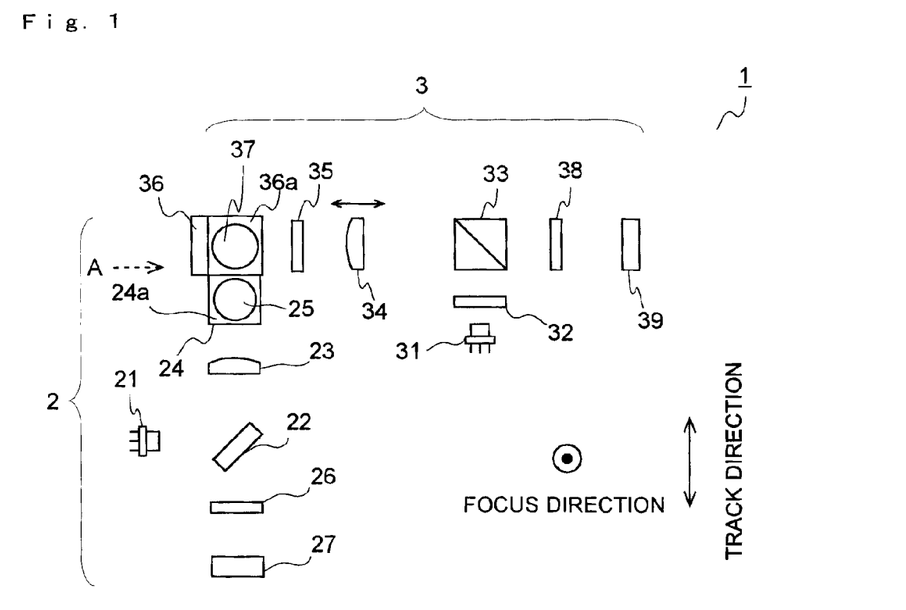
FIG. 1 is a schematic plan view showing the configuration of the optical systems of an optical pickup device according to an embodiment of the present invention.

FIG. 1 is a schematic plan view showing the configuration of the optical systems of an optical pickup device according to an embodiment of the present invention. As shown in FIG. 1, the optical pickup device 1 of this embodiment also includes, as in the conventional optical pickup device 100 (see FIG. 5), two separate optical systems, namely, the first optical system 2 and the second optical system 3. The first optical system 2 is used both for the DVD and the CD or either for the DVD or the CD; the second optical system 3 is used for the BD.

The first optical system 2 includes a first light source 21, a half mirror 22, a first collimating lens 23, a first upward reflecting mirror 24, a first objective lens 25, a first cylindrical lens 26 and a first light receiving element 27. Among them, the components other than the first objective lens 25 are mounted on a pickup base 11 (see FIG. 2), and the first objective lens 25 is mounted on a lens holder 12*a* of an objective lens actuator 12 (see FIG. 2). The detailed description of the objective lens actuator 12 will not be repeated because the configuration of the objective lens actuator 12 is the same as that of the objective lens actuator 200 included in the previously developed optical pickup device 100.

Figure 2:
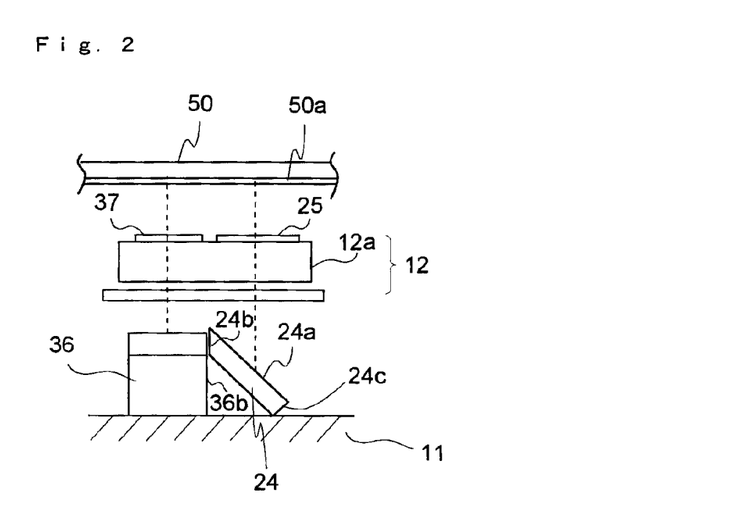
FIG. 2 is a side view showing the relationship between an upward reflecting mirror and an objective lens in the optical pickup device according to this embodiment as seen along a broken line arrow A shown in FIG. 1.

FIG. 2 is a side view showing the relationship between the upward reflecting mirror and the objective lens in the optical pickup device 1 of this embodiment, as seen along a broken line arrow A shown in FIG. 1. In FIG. 2, in order for the relationship with an optical disc 50 to be easily understood, the optical disc 50 is shown in the figure. The reference numeral 50*a* in FIG. 2 represents the information storage surface of the optical disc 50.

As compared with the previously developed optical pickup device 100, the first optical system 2 further includes the first cylindrical lens 26, and the optical actions of the other components are basically the same as each other. Thus, the description of the optical actions of the components will not be repeated. The first cylindrical lens 26 will be described later.

The second optical system 3 includes a second light source 31, a diffraction element 32, a polarization beam splitter 33, a second collimating lens 34, a quarter wavelength plate 35, a second upward reflecting mirror 36, a second objective lens 37, a second cylindrical lens 38 and a second light receiving element 39. Among them, the components other than the second objective lens 37 are mounted on the pickup base 11 (see FIG. 2), and the second objective lens 37 together with the first objective lens 25 are mounted on the lens holder 12*a* of the objective lens actuator 12 (see FIG. 2). The detailed description of the second optical system 3 will not be repeated because the configuration thereof is the same as that of the previously developed optical pickup device 100.

As shown in FIG. 1, in the optical pickup device 1 of this embodiment, the first optical system 2 and the second optical system 3 are arranged such that a direction in which laser light from the first light source 21 enters the first upward reflecting mirror 24 is substantially perpendicular to a direction in which laser light from the second light source 31 enters the second upward reflecting mirror 36. The optical pickup device 1 differs in this point from the previously developed optical pickup device 100, and this allows the two objective lenses 25 and 37 mounted on the lens holder 12*a* (see FIG. 2) to be arranged as close to each other as possible at a low cost. This will be described below.

In order for the two objective lenses 25 and 37 to be arranged as close to each other as possible, it is necessary to bring the reflective surface 24*a* of the first upward reflecting mirror 24 as close to the reflective surface 36*a* of the second upward reflecting mirror 36 as possible. Hence, the shape of the two upward reflecting mirrors 24 and 36 and the position relationship therebetween are important.

Figure 3A:
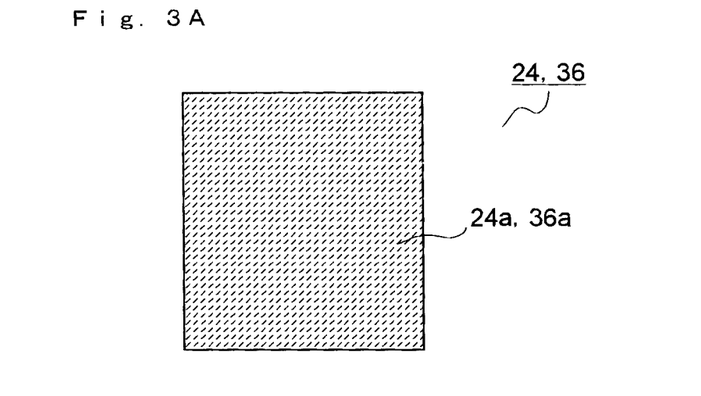
FIG. 3A is a schematic plan view showing the configuration of two upward reflecting mirrors included in the optical pickup device of this embodiment as seen from a reflective surface.
Figure 3B:
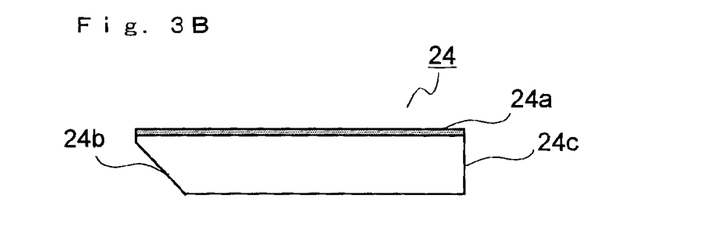
FIG. 3B is a schematic side view showing the first upward reflecting mirror included in the optical pickup device of this embodiment.
Figure 3C:
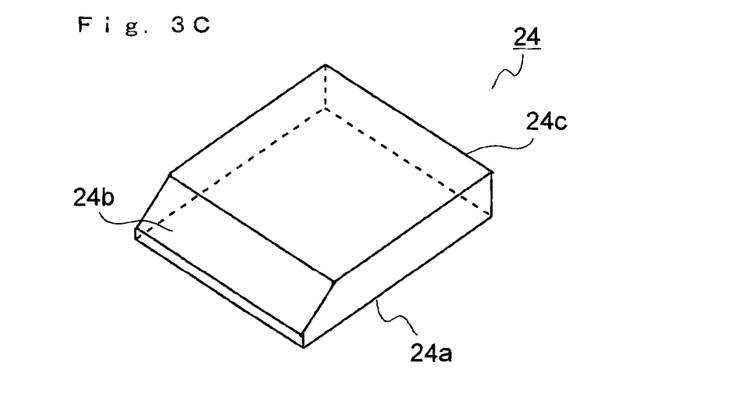
FIG. 3C is a schematic perspective view showing the configuration of the first upward reflecting mirror included in the optical pickup device of this embodiment as seen from the back of the reflective surface.
Figure 3D:
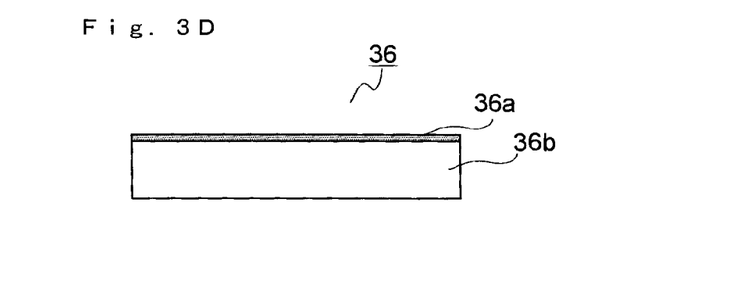
FIG. 3D is a schematic side view showing the second upward reflecting mirror included in the optical pickup device of this embodiment.

FIGS. 3A, 3B, 3C and 3D are diagrams for showing the configuration of the two upward reflecting mirrors 24 and 36 included in the optical pickup device 1 of this embodiment. FIG. 3A is a schematic plan view showing the configuration of the two upward reflecting mirrors 24 and 36 as seen from the reflective surfaces 24*a* and 36*a*. FIG. 3B is a schematic side view of the first upward reflecting mirror 24. FIG. 3C is a schematic perspective view showing the configuration of the first upward reflecting mirror 24 as seen from the back of the reflective surface 24*a*. FIG. 3D is a schematic side view of the second upward reflecting mirror 36.

In the first upward reflecting mirror 24 and the second upward reflecting mirror 36, a metal film formed of, for example, aluminum is coated on the outer surface of a solid member such as glass, and thus the reflective surfaces 24*a* and the 36*a* are formed. When these upward reflecting mirrors 24 and 36 are seem from the reflective surfaces 24*a* and 36*a*, they are substantially rectangular as shown in FIG. 3A, and the first upward reflecting mirror 24 and the second upward reflecting mirror 36 are a plate-shaped member that is substantially rectangular as seen in plan view. They are formed in this shape because this makes it easy to work the upward reflecting mirrors 24 and 36. The sizes of the reflective surfaces 24*a* and 36*a* of the upward reflecting mirrors 24 and 36 are determined by the effective diameters of the objective lenses 25 and 37.

As shown in FIGS. 3B and 3C, in the first upward reflecting mirror 24, a cut surface 24*b* is formed by cutting the side surface (surface perpendicular to the reflective surface 24*a*) of the plate-shaped member (rectangular parallelepiped) obliquely (for example, at an angle of 45 degrees) with respect to the reflective surface 24*a*. On the other hand, as shown in FIG. 3D, in the second upward reflecting mirror 36, such a cut surface is not formed, and it is simply formed in the shape of a rectangular parallelepiped.

Although, unlike the second upward reflecting mirror 36, the cut surface 24b needs to be formed in the first upward reflecting mirror 24, this produces little increase in cost. Specifically, when the upward reflecting mirrors 24 and 36 are formed, a large number of them are produced, and thus a process is performed of preparing a plate-shaped base member and dicing this base member into a plurality of members substantially in the shape of a rectangular parallelepiped. When the dicing is performed, a normal cutter is combined with a separate cutter for performing oblique cutting, and thus it is possible to obtain, without an additional process for forming only the cut surface 24b being performed, members in which the cut surface 24b is formed. This produces little increase in cost.

When the upward reflecting mirrors 24 and 36 are arranged on the pickup base 11 of the optical pickup device 1, the reflective surfaces 24a and 36a are arranged to be inclined about 45 degrees with respect to the direction of propagation of the laser light from the light sources 21 and 31. As described above, in this embodiment, the direction in which the laser light from the first light source 21 enters the first upward reflecting mirror 24 is substantially perpendicular to the direction in which the laser light from the second light source 31 enters the second upward reflecting mirror 36. Hence, as shown in FIG. 2, the first upward reflecting mirror 24 is arranged such that the side surface 24c opposite the cut surface 24b of the first upward reflecting mirror 24 is placed on the lower side, and thus it is possible to arrange the cut surface 24b and a side surface 36b of the second upward reflecting mirror 36 substantially parallel to and opposite each other. In other words, it is possible to prevent the interference with the second upward reflecting mirror 36 resulting from the thickness of the first upward reflecting mirror 24, and this makes it possible to bring the reflective surface 24a and the reflective surface 36a as close to each other as possible.

As described above, in the optical pickup device 1 of this embodiment, the first optical system 2 and the second optical system 3 are arranged such that the direction in which the laser light from the first light source 21 enters the first upward reflecting mirror 24 is substantially perpendicular to the direction in which the laser light from the second light source 31 enters the second upward reflecting mirror 36. Thus, simply by preparing the upward reflecting mirror in which one side surface of the rectangular parallelepiped is cut, it is possible to arrange the reflective surfaces of the two upward reflecting mirrors close to each other. It is therefore possible to arrange the two objective lenses mounted on the lens holder as close to each other as possible at a low cost.

Incidentally, in this embodiment, the first optical system 2 and the second optical system 3 are arranged such that the direction in which the laser light from the first light source 21 enters the first upward reflecting mirror 24 is substantially perpendicular to the direction in which the laser light from the second light source 31 enters the second upward reflecting mirror 36. In this case, the direction of the astigmatism produced by the half mirror 22 of the first optical system 2 does not coincide with the direction necessary to obtain the astigmatism-type focus error signal. Hence, in this embodiment, as means for introducing the astigmatism in the optical path between the half mirror 22 and the first light receiving element 27, the first cylindrical lens 26 is arranged, and thus the direction in which the astigmatism is produced is adjusted.

In this embodiment, the first cylindrical lens 26 is further provided as compared with the conventional configuration. However, the cost for further providing it can be lowered than a cost necessary to work the upward reflecting mirror by the conventional method.

Instead of the plate-shaped half mirror 22, a beam splitter obtained by adhering prisms together may be used. Instead of the half mirror 22, a plate-shaped polarization beam splitter may be used in combination with a quarter wavelength plate. In the second optical system 3, in order to reduce the cost, instead of the polarization beam splitter 33, the plate-shaped polarization beam splitter may be used. When the efficiency with which light is utilized is sufficiently high, instead of the polarization beam splitter 33, either a non-polarization beam splitter obtained by adhering prisms together or a plate-shaped half mirror may be used. In this case, the quarter wavelength plate 35 can be eliminated.

(Others)

The embodiment described above is just an example, and the present invention is not limited to this embodiment; many modifications are possible without departing from the scope of the present invention.

Figure 4:
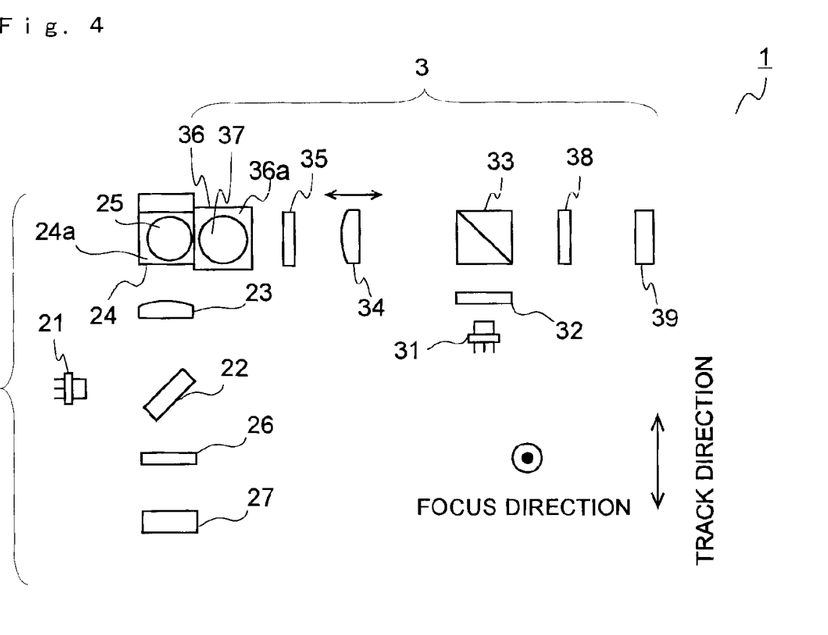
FIG. 4 is a diagram showing another embodiment of the optical pickup device according to the present invention.

For example, in the embodiment described above, the cut surface 24b is formed on the first upward reflecting mirror 24, and thus it is possible to bring the two objective lenses 25 and 37 close to each other. However, the present invention is not intended to be limited to this configuration. Instead of forming the cut surface 24b on the first upward reflecting mirror 24, the same cut surface (cut surface formed by cutting the side surface of the plate-shaped member in the shape of a rectangular parallelepiped obliquely with respect to the reflective surface 36a) may be formed on the second upward reflecting mirror 36. In this case, as shown in FIG. 4, the direction in which the two objective lenses 25 and 37 are aligned coincides not with the track direction (the same as the radial direction) but with the direction (tangential direction) perpendicular to the track direction.

In the embodiment described above, as the means for introducing the astigmatism, the first cylindrical lens 26 is arranged in the optical path between the half mirror 22 and the first light receiving element 27. However, the present invention is not limited to this configuration; for example, instead of the first cylindrical lens 26, a plate-shaped glass member may be arranged. In this case, it is necessary to adjust the orientation of the plate-shaped glass member so as to produce the astigmatism in the desired direction.

In the embodiment described above, the first optical system 2 is used both for the DVD and the CD or either for the DVD or the CD, and the second optical system 3 is used for the BD. However, it is needless to say that the present invention is not limited to what optical disc each of the optical systems is used for.

The present invention can be suitably used when, in an optical pickup device having two separate optical systems, objective lenses included in the optical systems are desired to be arranged close to each other.

What is claimed is:

1. An optical pickup device comprising:
   a first optical system including:
      a first light source;
      a first mirror member that reflects light from the first light source to change a direction of propagation of the light to a direction substantially perpendicular to information storage surface of an optical disc;
      a first objective lens that condenses the light reflected off the first mirror member on the information storage surface; and a first light receiving element that receives return light resulting from the reflection off the information storage surface;

a second optical system including:
- a second light source that emits light having a wavelength different from the first light source;
- a second mirror member that reflects the light from the second light source to change a direction of propagation of the light to the direction substantially perpendicular to the information storage surface;
- a second objective lens that condenses the light reflected off the second mirror member on the information storage surface; and
- a second light receiving element that receives return light resulting from the reflection off the information storage surface; and
- an objective lens actuator that includes a lens holder holding the first objective lens and the second objective lens and that can move the first objective lens and the second objective lens at least in a focus direction and in a track direction, wherein the first optical system and the second optical system are arranged such that a direction in which the light from the first light source enters the first mirror member is substantially perpendicular to a direction in which the light from the second light source enters the second mirror member, the first mirror member and the second mirror member each is a plate-shaped member that is substantially rectangular as seen from a reflective surface, a cut surface is formed in one of the first mirror member and the second mirror member by cutting a side surface of the plate-shaped member obliquely with respect to the reflective surface, and the cut surface and one side surface of the first mirror member or the second mirror member in which a cut surface is not formed are arranged substantially parallel to and opposite each other, and the first mirror member and the second mirror member are arranged close to each other.

2. The optical pickup device of claim 1,
wherein, in at least one of the first optical system and the second optical system, a plate-shaped light splitter is provided, and the light splitter guides part of the light from the light source to the optical disc and guides part of the return light from the optical disc to the light receiving element.

3. The optical pickup device of claim 2,
wherein an astigmatism introducing portion that introduces astigmatism is provided in an optical path between the light splitter and the light receiving element.

4. The optical pickup device of claim 3,
wherein the astigmatism introducing portion is a cylindrical lens.

5. The optical pickup device of claim 2,
wherein the optical system including the light splitter is used both for a DVD and a CD or either for the DVD or the CD, and the other optical system is used for a BD.

6. The optical pickup device of claim 1,
wherein, in at least one of the first optical system and the second optical system, a plate-shaped light splitter is provided, and the light splitter guides part of the light from the light source to the optical disc and guides part of the return light from the optical disc to the light receiving element.

7. The optical pickup device of claim 6,
wherein an astigmatism introducing portion that introduces astigmatism IS provided in an optical path between the light splitter and the light receiving element.

8. The optical pickup device of claim 7,
wherein the astigmatism introducing portion is a cylindrical lens.

9. The optical pickup device of claim 6,
wherein the optical system including the light splitter is used both for a DVD and a CD or either for the DVD or the CD, and the other optical system is used for a BD.

* * * * *